United States Patent [19]
Merklinger

[11] Patent Number: 5,676,320
[45] Date of Patent: *Oct. 14, 1997

[54] MOBILE TIRE SHREDDER

[75] Inventor: Paul Merklinger, Windsor, Canada

[73] Assignee: Royal Recovery Systems, Inc., Windsor, Canada

[ * ] Notice: The term of this patent shall not extend beyond the expiration date of Pat. No. 5,395,061.

[21] Appl. No.: 398,137

[22] Filed: Mar. 3, 1995

Related U.S. Application Data

[63] Continuation-in-part of Ser. No. 56,320, May 3, 1993, Pat. No. 5,395,061.

[51] Int. Cl.$^6$ .................................. B02C 21/02
[52] U.S. Cl. .................... 241/101.741; 241/101.742; 241/186.35; 241/DIG. 31; 241/DIG. 38
[58] Field of Search ............ 241/101.74, 101.741, 241/101.742, DIG. 31, DIG. 38, 186.35

[56] References Cited

U.S. PATENT DOCUMENTS

| | | | |
|---|---|---|---|
| 2,853,240 | 9/1958 | Mahoney, Jr. | 241/101.7 |
| 3,913,850 | 10/1975 | Daniel | 241/101.7 |
| 4,374,573 | 2/1983 | Rouse et al. | 241/101.7 |
| 4,786,003 | 11/1988 | Johnson | 241/101.7 |
| 5,074,479 | 12/1991 | Lamar | 241/101.7 |
| 5,186,397 | 2/1993 | Orlando | 241/23 |
| 5,395,061 | 3/1995 | Merklinger | 241/DIG. 31 X |

*Primary Examiner*—John M. Husar
*Attorney, Agent, or Firm*—Young & Basile, P.C.

[57] ABSTRACT

A motor truck for use in collecting and processing solid waste material such as scrap tires. The truck includes a chassis including a cab; a body structure positioned on the chassis behind the cab and defining a storage chamber; a shredder mounted on top of the body structure forwardly of the storage chamber; a compactor positioned within the body structure beneath the shredder and forwardly of the storage chamber; and a conveyor system for conveying tires from a curbside location upwardly for discharge downwardly into the open upper end of the shredder. The shredded tires are discharged downwardly into the body structure rearwardly of the compactor, whereafter the compactor is actuated to stroke rearwardly and compress the tire shreds into the storage chamber. After the truck has visited a series of retail tire outlets and the storage chamber is full of tire shreds, the truck returns to a recycling facility where a door at the rear of the storage chamber is opened and the compactor is utilized as an ejector to eject the tire shreds from the storage chamber. At the recycling facility the tire shreds are processed to form a rubber crumb material and the rubber crumb material is further processed at further processing facilities to form diverse finished products.

10 Claims, 7 Drawing Sheets

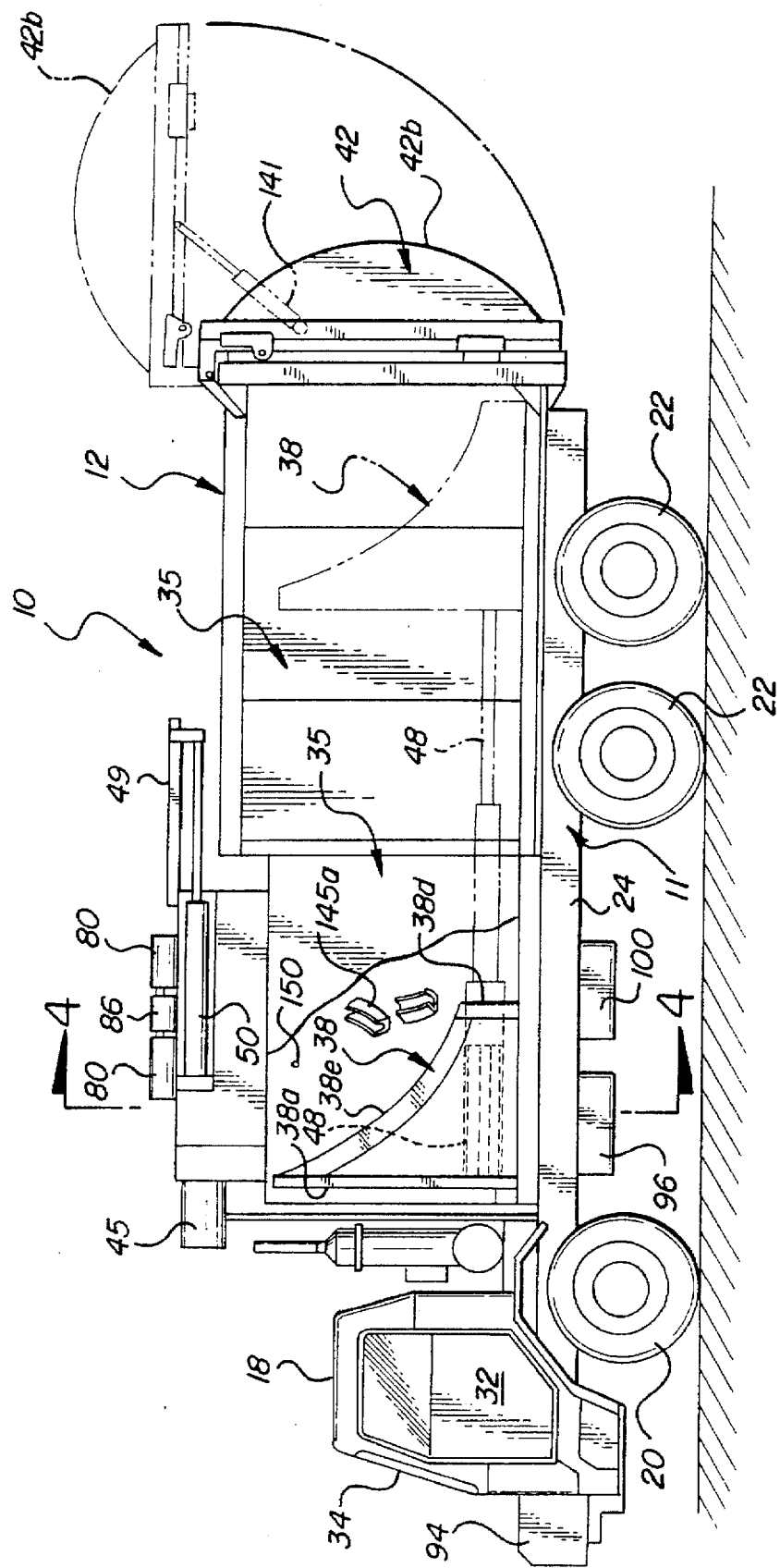

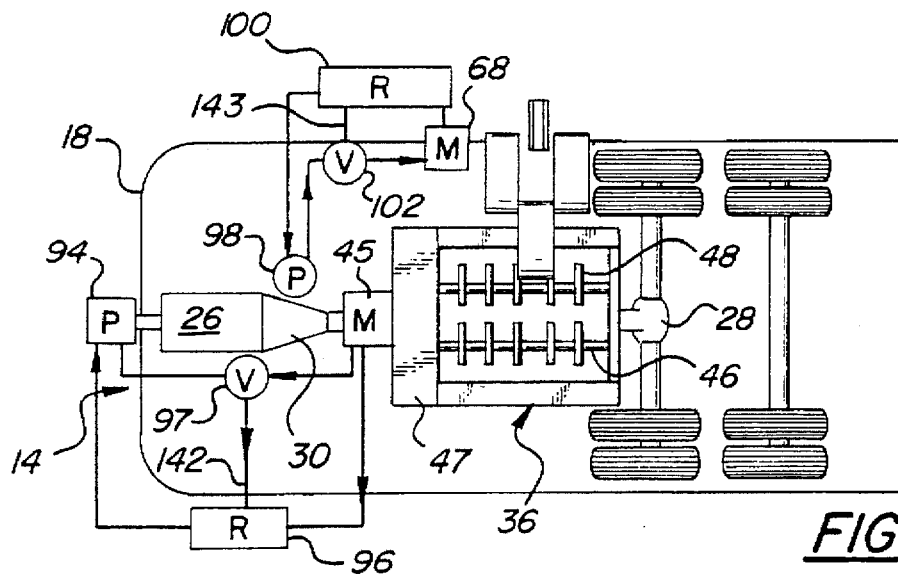
*FIG-5*
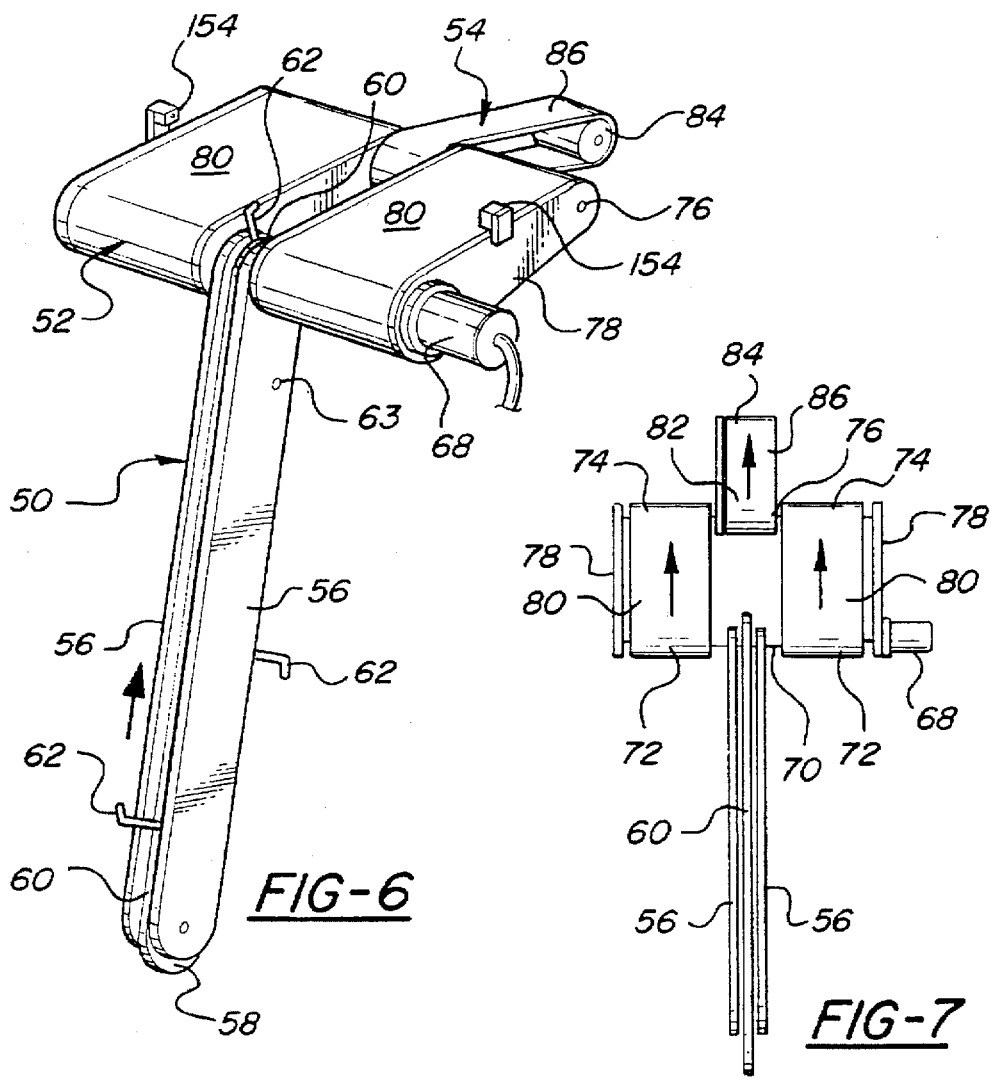
*FIG-6*
*FIG-7*

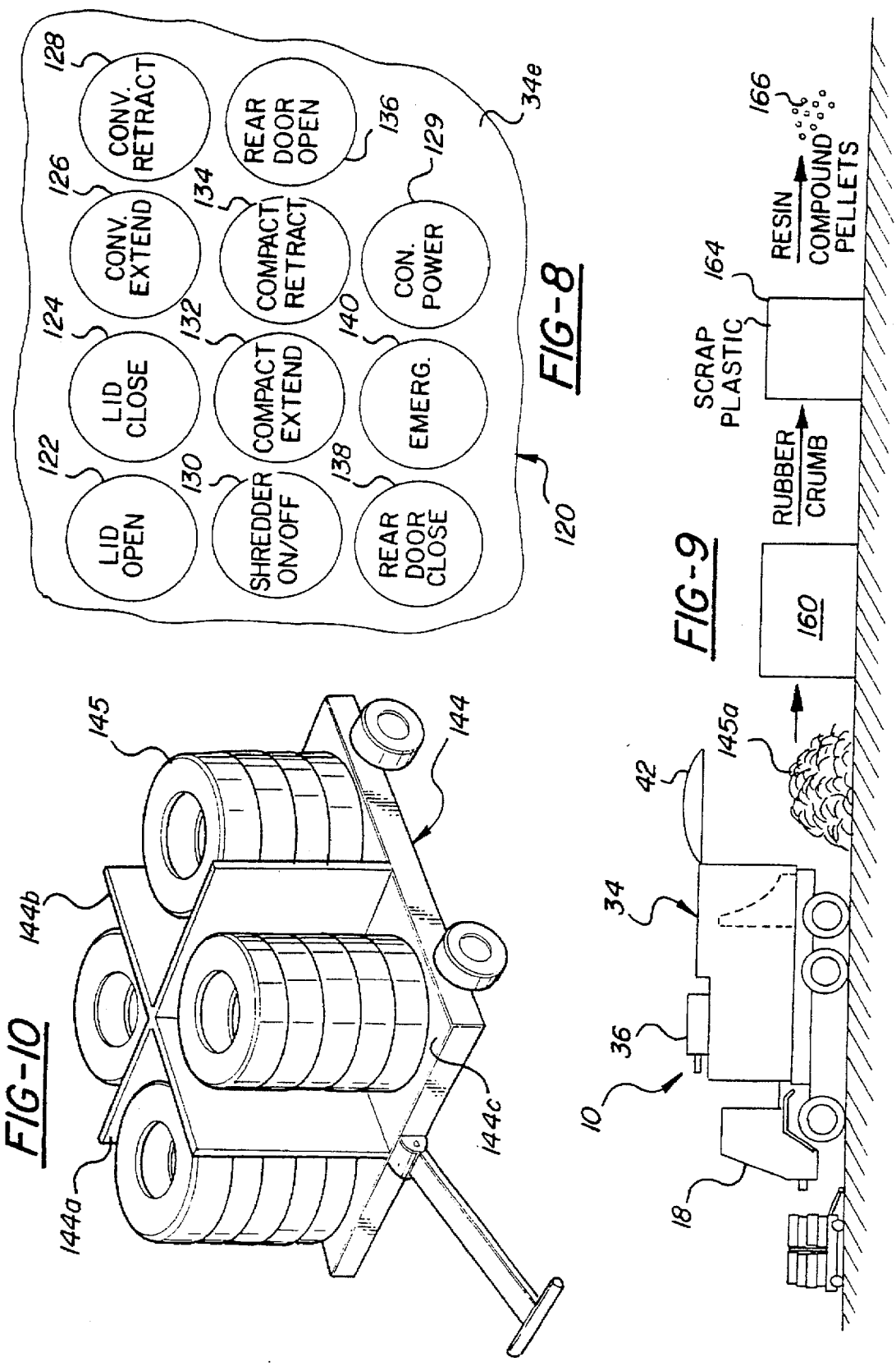

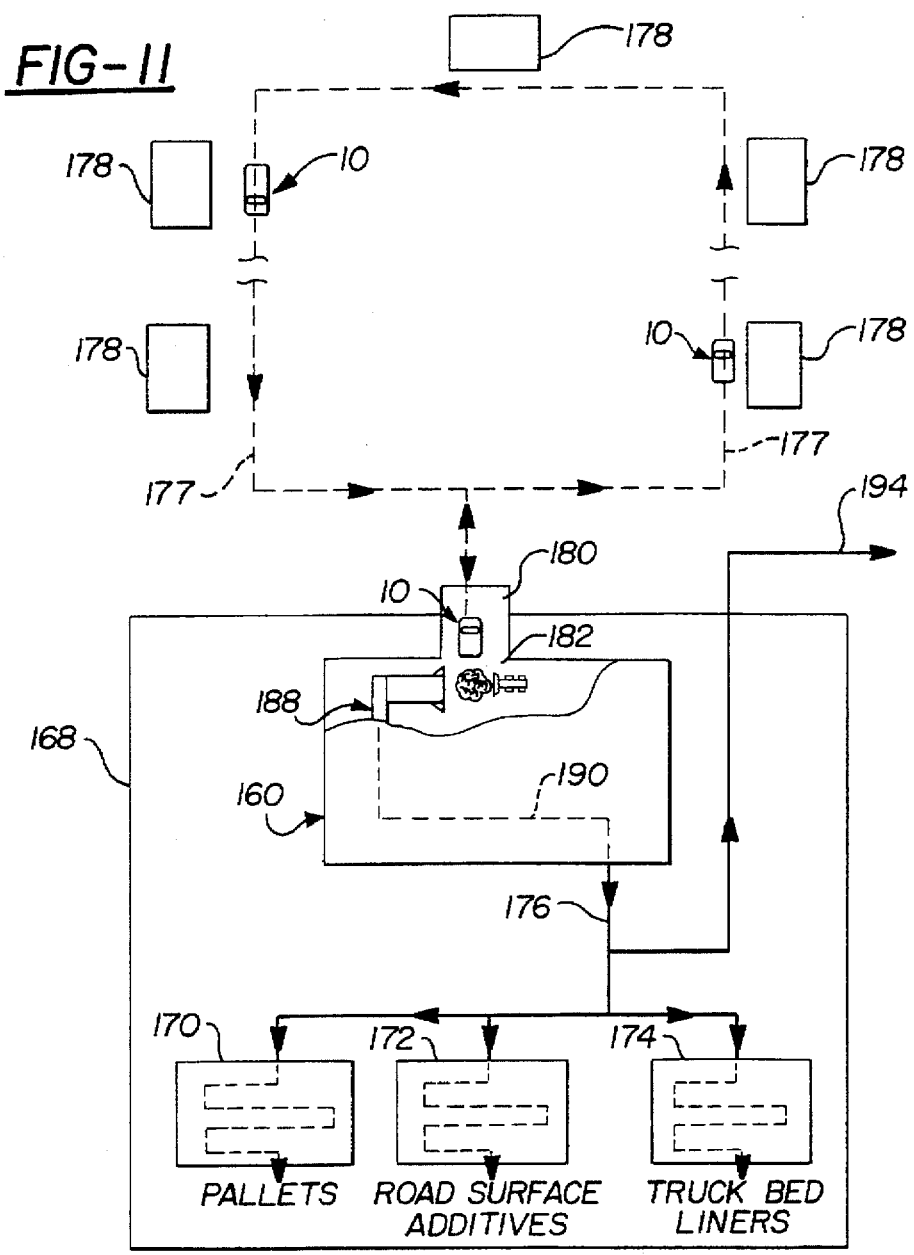

MOBILE TIRE SHREDDER

RELATED APPLICATION

This application is a continuation-in-part of U.S. patent application Ser. No. 08/056,320, filed May 3, 1993 now U.S. Pat. No. 5,395,061.

BACKGROUND OF THE INVENTION

This invention relates to a mobile apparatus for mechanically shearing or shredding solid waste material such as rubber tires.

Disposal of solid waste materials represents a substantial ecological and economic problem. More particularly, scrap automobile tires present an especially vexing ecological and economic problem. Each year there are an estimated 280 million scrap tires discarded throughout North America. Unwanted scrap tire piles scattered throughout the countryside have been estimated to contain as many as 3 billion tires. Scrap tires' poor biodegradability, their tendency to trap gasses and rise to the surface in landfills, the serious fire hazard scrap tires represent, and the breeding environment that unwanted scrap tires offer to disease-carrying pests such as rodents and mosquitos have caused them to be classified as a serious environmental nuisance.

The vast majority of used tires are generated at retail tire outlets where the used tires are removed from vehicles prior to installation of new tires. Traditionally, the tires have been collected from the retail tire outlets by small independent truck operators who merely pick up the old tires, receive a fee for each tire collected, and deposit the old tires at municipal or private dump sites. Specifically, the tires are typically taken from the retailer in a stake truck, are then transferred from the stake truck into a transport trailer, and are then taken in the transport trailer to a tire dump site. This entire collection process, even if efficiently carried out, only exacerbates the existing environmental problem since the supply of festering tires at the dump sites continues to multiply and the availability of dump sites continues to dwindle. Further, the collection process itself is rather inefficient since it is not uncommon for individuals to collect tires from a retail outlet, receive a specified payment for each tire collected, but then never deliver the tires to an authorized dump site. Rather, the tires end up being dumped at the most convenient or closest location where they become an eyesore and further exacerbate the environmental problems associated with tire disposal.

SUMMARY OF THE INVENTION

This invention is directed to the provision of an improved apparatus and methodology for recycling used tires.

More specifically, this invention is directed to the provision of an improved methodology and apparatus whereby the tires are efficiently collected from retail outlets and efficiently recycled.

The invention contemplates the provision of a unique motor truck capable of being dispatched to retail tire outlets where used tires are collected on a regular basis, shredded on the site by a shredder carried on the vehicle, stored in shredded form in a storage container provided on the vehicle, and then, when the storage container is full, taken by the truck to a suitable processing or recycling facility.

According to an important feature of the invention, the truck comprises a chassis; a shredder mounted on the chassis; a storage chamber mounted on the chassis; and a compactor mounted on the chassis for stroking movement, positioned to receive the output of the shredder, and operative when stroked to move the shredded output into the storage chamber. This arrangement allows the tires or other waste material to be shredded at the retail site and stored in the vehicle so as to enable the vehicle to visit several retail sites and, when the storage chamber is full of the shredded material such as shredded tires, return to a recycling center to deliver the shredded material to the recycling center for use in producing a suitable compound for recycling purposes.

According to a further feature of the invention, the truck includes a body assembly mounted on the chassis and including a body structure defining the storage chamber; the shredder is mounted on the body structure; and the compactor is positioned within the body structure beneath the shredder and rearwardly of the storage chamber. With this arrangement, the compactor receives the discharge of the shredder and operates when actuated to move the shredded discharge into the storage chamber so as to make room for further shredded product from the shredder.

According to a further feature of the invention, the truck further includes a conveyor assembly extending from a location proximate the support surface for the motor truck to a location proximate the entry to the shredder so that waste articles such as tires may be deposited on the conveyor assembly proximate the support surface and moved by the conveyor assembly to the shredder for shredding by the shredder and delivery to the compactor for movement into the storage chamber.

According to a further feature of the invention, the body structure includes a closure member at the rear end of the storage chamber operative when opened to allow the contents of the storage chamber to be discharged rearwardly out of the chamber and the compactor is operative when actuated with the closure member in an open position to discharge the contents of the storage chamber rearwardly out of the chamber through the open rear end of the body structure. This arrangement allows the compactor to serve both as a means of compacting the shredded material at each retail site as well as a means of ultimately ejecting all of the shredded material after the storage container has been filled and after the vehicle has been driven to a suitable recycling location.

According to a further feature of the invention, the truck includes a hydraulic pump driven by the engine of the truck and a hydraulic motor driving the shredder and receiving a supply of pressurized hydraulic fluid from the hydraulic pump. This arrangement allows the truck prime mover to provide the power for the shredder rather than requiring a separate power source on the vehicle to power the shredder.

According to a further feature of the invention, the truck further includes a further pump driven by the engine of the truck and a further hydraulic motor driving the conveyor system and receiving a supply of pressurized hydraulic fluid from the conveyor pump. This arrangement allows the truck to perform both the pickup and the shredding of the waste material without the need for a separate power source on the vehicle.

The invention also provides a methodology for producing a rubber crumb material at a recycling center. According to the invention methodology, vehicles are dispatched to retail sales locations for rubber tires; at each location a supply of used tires is collected, the tires are shredded, and the shredded tires are compacted and stored in the vehicles; and the vehicles, carrying the stored, compacted shredded tires, are thereafter returned to the recycling center where the shredded tires are discharged for reduction to rubber crumb material. This methodology provides a convenient means of addressing the ecological problems created by used tires and further provides a source of commercially usable rubber crumb material.

According to a further feature of the invention methodology, the method includes the further steps of providing at least one processing facility proximate the recycling facility capable of accepting rubber crumb material and converting it into a finished product; feeding the rubber crumb material produced at the recycling facility to the processing facility; and producing a finished product at the processing facility utilizing the rubber crumb material. This methodology provides a ready and efficient means of converting used tires to a useful finished product.

BRIEF DESCRIPTION OF THE DRAWINGS

FIG. 3 is a side elevational view of the roadside of the invention motor truck;

FIG. 4 is a cross-sectional view taken on line 4—4 of FIG. 3;

FIG. 5 is a diagrammatic plan view of the invention truck;

FIGS. 6 and 7 are detail views of a conveyor system utilized in the invention truck;

FIG. 8 is a detail view of a control panel provided on the invention motor truck;

FIG. 9 is a schematic view illustrating the invention methodology;

FIG. 10 is a perspective view of a cart utilized in carrying out the invention methodology;

FIG. 11 is a somewhat schematic view further illustrating the invention methodology;

FIG. 13 shows a manifest document.

DETAILED DESCRIPTION OF THE PREFERRED EMBODIMENT

Figure 1:
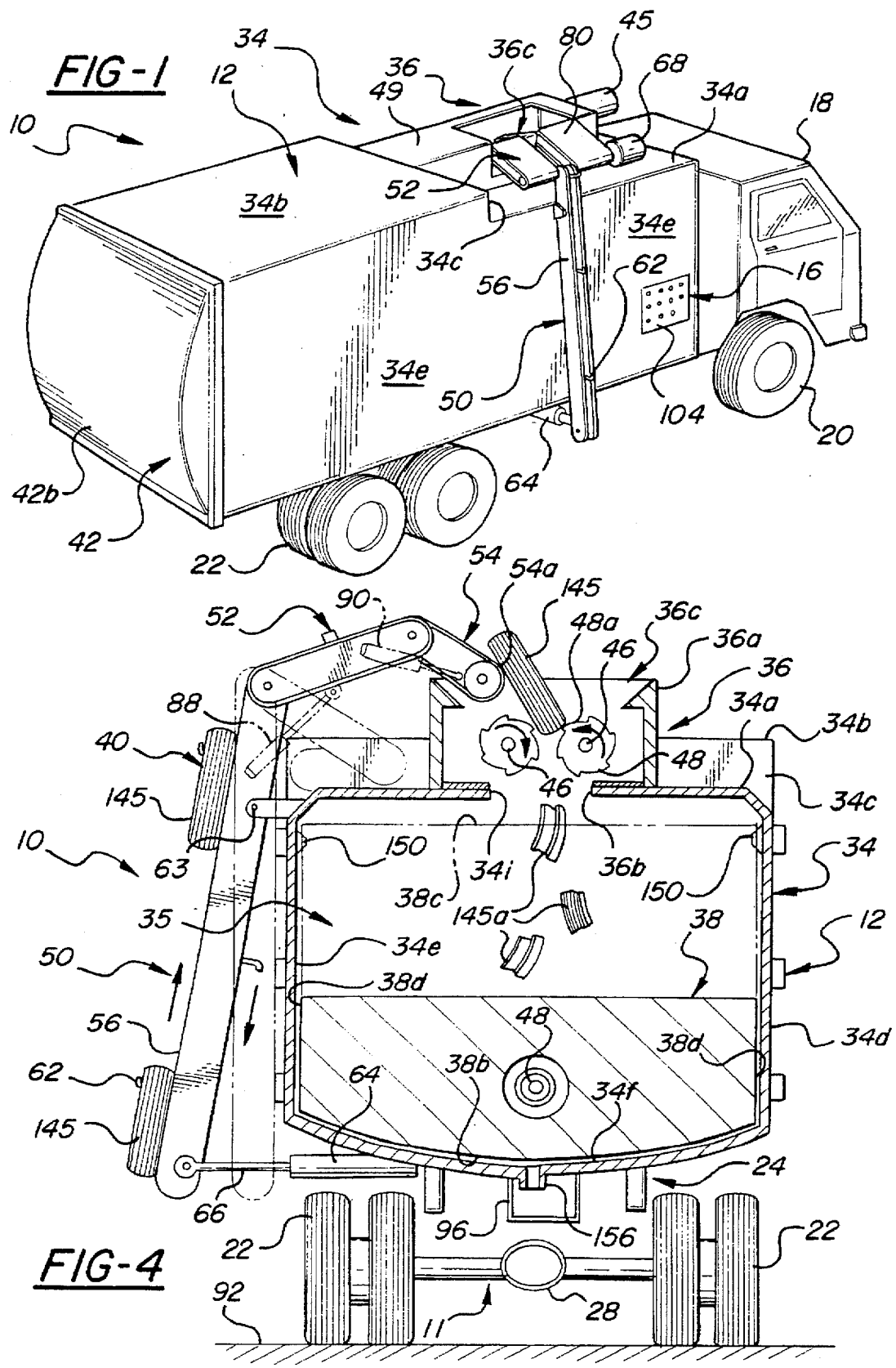
FIG. 1 is a perspective curbside view of a motor truck according to the invention.
Figure 2:
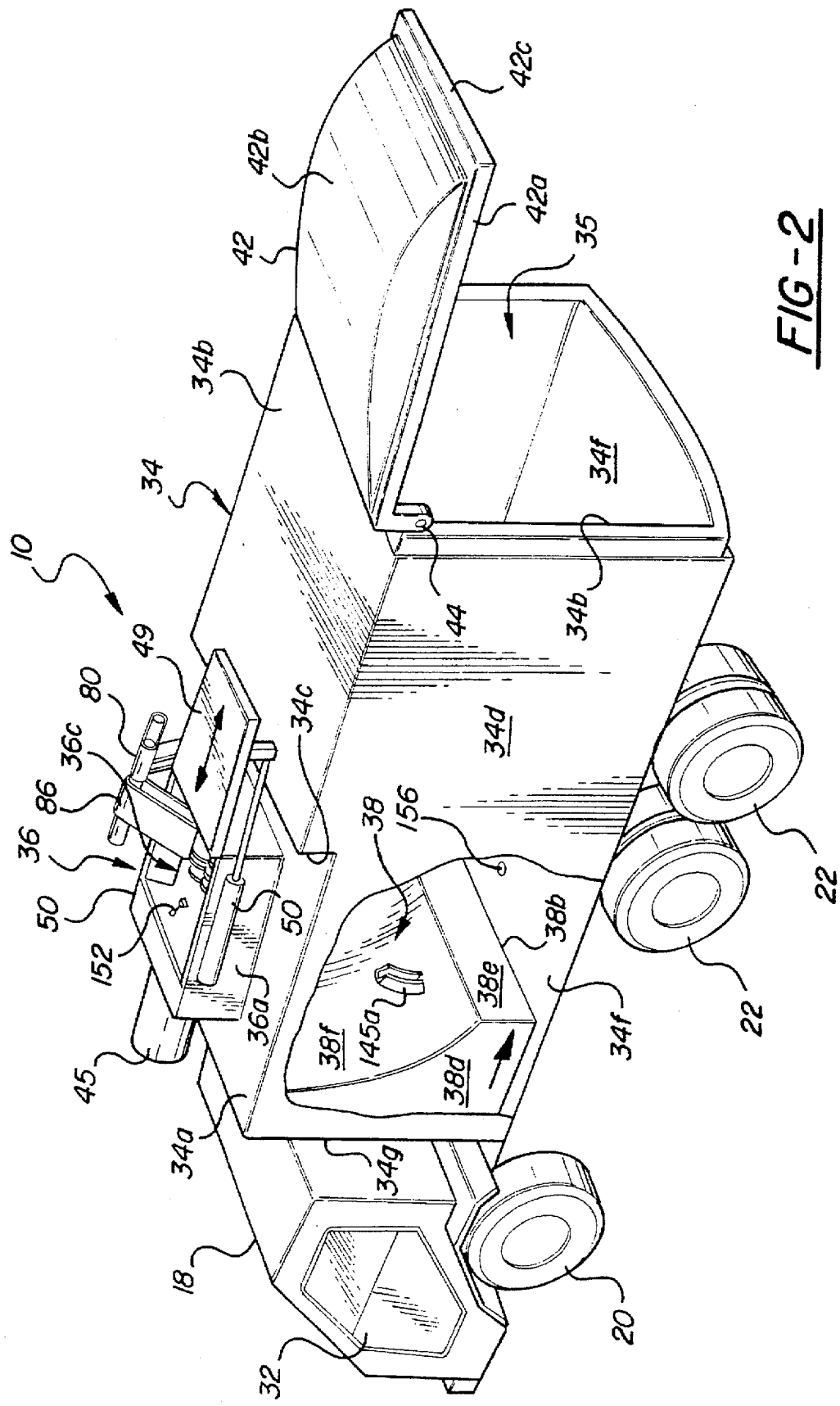
FIG. 2 is a perspective roadside view of the invention motor truck.

The invention motor truck 10, in overview, is designed to travel to a retail tire outlet, pick up a supply of used tires from the outlet, shred the tires on site, store the shredded tires in the truck, thereafter visit further retail tire outlets until the storage capacity of the truck has been exhausted and thereafter return to a recycling center where the shredded tire product is ejected from the truck for use in formulating, for example, a rubber crumb material for recycling applications.

The invention motor truck 10, broadly considered, includes a chassis 11, a body assembly 12, a hydraulic system 14, and a control system 16.

Chassis 11 is of known form and includes a cab 18, front wheels 20, rear wheels 22, a platform frame 24, an engine 26 of gasoline or diesel configuration, and a drive train 28 including a transmission 30.

Cab 18 may, as shown, be of the cab-over-engine type and may include a side entry door 32 and a windshield 34. Front wheels 20 are steerable and may, if desired, also be driven.

Rear wheels 22 have a tandem configuration with either the front set of wheels driven by the drive train 28 or both front and rear sets of wheels driven by the drive train.

Platform frame 24 is of standard construction and includes parallel frame rails 32 extending rearwardly from the cab 18 to a position rearwardly of the rear wheels. It will be understood that the front and rear wheels are connected to the cab 18 and the rails 32 by suspension means, not illustrated.

Body assembly 12 includes a body structure 34, a shredder 36, a compactor 38, and a conveyor assembly 40.

Body structure 34 is supported in known manner on chassis rails 32 rearwardly of cab 18 and defines a storage chamber 35. Body structure 34 includes a forward top wall 34a, a rearward top wall 34b joined to the forward top wall 34a by a vertical wall 34c, side walls 34d and 34e, a bottom wall 34f, a front wall 34g, and a rear opening 34h closed by a gate 42 mounted for pivotal movement about a hinge axis 44. Walls 34a, 34b, 34c, 34d, 34e, and 34g have a flat configuration and bottom wall 34f has a downwardly bowed configuration. Gate 42 includes side walls 42a and a bowed main body portion 42b.

Shredder 36 is positioned on body structure top wall 34a and includes a rectangular box or bin 36a defining a bottom discharge opening 36b aligned with an opening 34i in body structure forward top wall 34a. Shredder 36 further includes a hydraulic motor 45 driving parallel shredder shafts 46 through a gear mechanism 47. Each shaft carries a plurality of rotary shearing blades 48 having teeth 48a. The shafts are counter rotated so that the shearing blades 48 are also counter rotated as seen by the arrows in FIG. 4. Box 36a defines an open top 36c so that material may be fed into the box from above for shredding by the counter rotating blades 48. Shredder 36 may take various forms and may, for example, comprise a shredder available from MAC Corporation of Grand Prairie, Tex. as Saturn Shredder Model No. 4428. Shredder 36 also desirably includes a lid 49 mounted on box 36a for movement between the illustrated open position and a closed position closing the open top of the box 36a. The lid is moved between its open and closed positions by a hydraulic cylinder 50 secured to a side face of box 36a.

Compactor 38 is positioned within body structure 34 and has a transverse cross-sectional configuration generally corresponding to the cross-sectional configuration of the body structure. Specifically, compactor 38 includes a flat front wall 38a, a bowed bottom wall 38b corresponding in configuration to the bowed bottom wall 34f of the body structure; a top wall 38c; flat side walls 38d mounted for sliding engagement with body structure side walls 34d, 34e; and a rear surface including a flat lower rear surface 38e and an arcuate upper rear surface 38f extending from the top edge of lower surface 38e in curvilinear fashion to the rear edge of the top wall 38c. Compactor 38c is movable linearly within body structure 34 in stroking fashion by a hydraulic cylinder 48 positioned between the front wall 34g of the body structure and the compactor and having a multiple cylinder telescopic configuration so that the cylinder may expand to many times its stowed configuration so as to enable the cylinder to move the compactor from the extreme forward position seen in solid lines in FIG. 3 to the extreme rearward position, proximate the rear opening 34h of the body structure, seen in dash lines in FIG. 3.

Conveyor assembly 40 is a three-part compound assembly including a chain conveyor 50, a split belt conveyor 52, and a tail conveyor 54.

Chain conveyor 50 includes a pair of rigidly interconnected beam members 56 rotationally supporting a sprocket 58 at their lower ends and a sprocket 60 at their upper ends, and a chain 60 trained around sprockets 58 and 60 and including spaced hooks 62. Beams 56 are pivoted to body structure 34 at 62 and a hydraulic cylinder 64 positioned beneath the body structure includes a piston rod 66 engaging the lower end of beams 56 and operative when actuated to move the chain conveyor 50 from the stored dotted line position of FIG. 4 proximate the side wall 34e of the body structure and an extended operative position, seen in solid lines in FIG. 4, in which the lower end of the chain conveyor has been pivoted outwardly about the pivot axis 62. Chain conveyor 50 is powered by a hydraulic motor 68 driving a shaft 70 which is drivingly connected to the upper sprocket 60.

Split belt conveyor 52 includes a pair of rollers 72 drivingly mounted on shaft 70 on opposite sides of chain conveyor 50, a pair of forward rollers 74 drivingly connected to a drive shaft 76 journalled at its opposite ends in side plates 78, and a pair of belts 80 trained around a respective pair of rollers 72, 74. Motor 68 is secured to the outboard face of one of the side plates 78 so that actuation of the motor upon receipt of a supply of pressurized hydraulic fluid powers chain conveyor 50 via sprocket 60 and powers split belt conveyor 52 via rollers 72.

Tail conveyor 54 includes a roller 82 drivingly secured to shaft 76, a free end roller 84 suitably connected to roller 82 by frame means (not shown) and a belt 86 trained around rollers 82 and 84. Tail conveyor 54 is also driven by hydraulic motor 68, via rollers 72, belts 80, rollers 74, shaft 76, and roller 82. A hydraulic cylinder 88 (shown diagrammatically in phantom in FIG. 4) interconnects the upper end of chain conveyor 50 and an intermediate location on split belt conveyor 52 and a further hydraulic cylinder 90 (also shown diagrammatically in phantom in FIG. 4) interconnects split belt conveyor 52 and tail conveyor 54.

Tail conveyor 54 is movable between a dash line stowed position seen in FIG. 4 to the solid line operative position seen in FIG. 4 by actuation of cylinder 64 to move the bottom of the chain conveyor outwardly; actuation of cylinder 88 to pivot twin belt conveyor 52 upwardly about the upper end of the chain conveyor; and actuation of cylinder 90 to pivot the tail conveyor 54 clockwise relative to the outboard end of the split belt 52. The combined action of the cylinders 64, 88, and 90 positions the lower end of the chain conveyor proximate the support surface 92 of the vehicle in spaced relation to the side wall of the vehicle and positions the delivery end 54a of the tail conveyor 54 in overlying relation to the blades 48 of the shredder.

Hydraulic system 14 includes a main pump 94 positioned forwardly of the cab of the vehicle and driven directly from the crank shaft of engine 26; hydraulic motor 45 driving the shredder; a hydraulic reservoir or tank 96 positioned beneath the body structure of the vehicle; and a valve 97.

Hydraulic system 14 further includes a further pump 98 driven by the transmission 30 of the vehicle; the conveyor pump 68; a reservoir or tank 100 positioned beneath the vehicle body structure; and a valve 102.

Control system 16 includes a control panel 104 positioned on the curb side of the truck forwardly of the conveyor assembly with a plurality of control buttons for controlling the various operations of the invention truck. Specifically, control panel 104 includes a control button 122 controlling the opening of the lid 49; a control button 124 controlling the closing of the lid 49; a control button 126 controlling the extension of the conveyor assembly 50; a control button 128 controlling the retraction of the conveyor assembly 50; a control button 129 controlling power to the conveyor assembly; a control button 130 constituting an ON/OFF switch for the shredder 36; a control button 132 controlling the extension of the compactor 38; a control button 134 controlling the retraction of the compactor 138; a control button 136 operative to open the rear door 42; a control button 138 operative to close the rear door 42; and an emergency system shutoff button 140.

Control button 122 is operative when actuated to apply pressurized fluid to hydraulic cylinder 50 in a sense to retract or open the lid 49; control button 124 is operative when actuated to actuate cylinder 50 in a sense to return the lid to a position closing the top of the shredder; control button 126 is operative when actuated to energize cylinders 64, 88, and 90 in a sense to move the conveyor system 50 from the retracted, stored dash line position of FIG. 4 to the solid line extended or operative position of FIG. 4 in which the discharge end 54a of tail conveyor 54 is positioned over the shredder blades 48; control button 128 is operative when actuated to energize cylinders 64, 88, and 90 in a sense to return the conveyor system to its stored dash line position of FIG. 4; control button 129 is operative when actuated to control valve 102 in a sense to deliver pressurized fluid from pump 98 to motor 68 so as to power the conveyor assembly and is operative when again actuated to control valve 102 in a sense to direct pressurized fluid from motor 68 and route the pressurized fluid via a bypass line 143 directly to reservoir 100 so as to shut off power to the conveyor assembly; control button 130 is operative when actuated to control valve 97 in a sense to deliver pressurized fluid from pump 94 to motor 46 so as to power the shredder and is operative when again actuated to control valve 97 in a sense to divert pressurized fluid from motor 46 and route the pressurized fluid via a bypass line 142 directly to the reservoir 96 so as to shut off power to the shredder; control button 132 is operative when actuated to energize cylinder 48 in a sense to extend the cylinder and stroke the compactor rearwardly toward the rear of the body structure; control button 132 is operative when actuated to energize the cylinder 148 in a sense to retract the cylinder and retract the compactor to its solid line position of FIG. 3; control button 136 is operative when actuated to actuate a hydraulic cylinder 141 in a sense move the door 42 to an open position; control button 138 is operative when actuated to energize cylinder 141 in a sense to move the rear door 42 to a closed position; and control button 140 is operative when actuated to shut off all power to the system in the event of a jam or other emergency.

In operation, the truck is driven by the operator to a retail sales outlet for motor vehicle tires where the used tires, accumulated at the retail sales outlet since the last visit of the truck, are collected, shredded, and stored in the storage chamber.

A cart 144 may be utilized to facilitate the storage of the used tires 145 at the retail outlet and to facilitate the loading of the tires onto the conveyor system 50. Specifically, cart 144 may comprise a pair of partitions 144a, 144b arranged at right angles to each other and upstanding from the bed 144c of the cart to divide the cart into four areas on each of which a plurality of tires (for example, five) can be stacked.

Upon the arrival of the motor truck at the retail site, the truck is parked with the engine idling so as to continuously drive pumps 94 and 98; the cart 142 is wheeled to a location proximate the conveyor assembly 50; control button 122 is actuated to move the lid 49 to an open position; control button 126 is actuated to move the conveyor assembly 50 to its extended operative position; control button 129 is actuated to deliver pressurized fluid from pump 98 to motor 68 to power the conveyor assembly; control button 130 is actuated to deliver pressurized fluid from pump 94 to motor 45 to power the shredder; the vehicle operator places a tire 145 on each hook 162 as the chain conveyor 56 moves in the direction of the arrows in FIGS. 4 and 6; the tires 145 are carried upwardly by chain conveyor 56, picked up by split belt conveyor 52 for delivery to tail conveyor 54, and discharged by tail conveyor 54 into the open top 36c of the shredder box 36a; and the tires falling downwardly into the open top of the shredder box 36a pass between the counter rotating shredder blades 48 where they are shredded by shredder blade teeth 48a to produce a plurality of tire shreds or fragments 145a which pass through aligned openings 36b and 34a for downward discharge into the storage chamber 35 defined by body structure 34 at a location above and immediately rearwardly of compactor 38.

After all of the tires 145 at the retail sales outlet have been loaded onto the conveyor system and shredded by the shredder, control button 130 is again actuated to divert pressurized fluid from hydraulic motor 45 and turn off the shredder whereafter control button 132 is actuated to energize hydraulic cylinder 48 in a sense to extend the compactor 38 and move the tire shreds 144a rearwardly within storage chamber 35; control button 134 is actuated to energize the hydraulic cylinder 48 in a sense to retract the compactor and return the compactor to its solid line position seen in FIG. 3; control button 124 is actuated to move the lid 49 to its closed position; control button 129 is actuated to shut off power to the conveyor assembly; and control button 128 is actuated to return the conveyor assembly to its stored position. The truck is now ready to be driven to another retail tire sales outlet where more tires 145 will be shredded and moved into the storage chamber. This process is continued until the storage chamber has been filled with tire shreds, whereafter the truck will return to a recycling facility 160 where the shredded contents of the truck are discharged. Specifically, upon arrival at the recycling facility, control button 136 is actuated to open the rear door; control button 132 is actuated to extend the compactor and move the compactor from the solid line position of FIG. 3 to the dash line position of FIG. 3 and discharge all of the shredded tire contents from the vehicle onto a suitable surface control button 134 is actuated to return the compactor to its solid line position of FIG. 3; and control button 138 is actuated to return the rear door 42 to its closed position.

The truck is now ready to resume the task of picking up used tires at a prescheduled series of retail tire outlets until the storage chamber has again been filled with tire shreds whereafter the truck will again return to the recycling facility 160 to discharge its shredded contents.

It will be understood that the extent to which compactor 38 is moved rearwardly upon actuation of control button 132 will depend upon the amount of tire shreds already in the storage chamber. Specifically, the hydraulic system supplying pressurized hydraulic fluid to cylinder 48 includes a pressure sensor which shuts off the delivery of pressurized fluid to the cylinder 48 after a predetermined hydraulic fluid pressure is sensed corresponding to a predetermined resistance being encountered by the rearwardly moving compactor. It will further be understood that the rearward stroke or movement of the compactor will be less and less as the storage chamber becomes more and more filled with tire shreds until a situation is reached in which literally no rearward movement of the compactor is possible because of the stored tire shreds. As a further precaution to guard against overloading the storage chamber and overstressing the compactor, a photoelectric eye 150 is provided in the body structure immediately beneath the discharge opening of the shredder. When the beam of the photoelectric eye 150 senses that the tire shreds have reached a level corresponding to the level of the beam, the beam disables the shredder and the compactor so as to preclude the delivery of further tire shreds to the storage chamber with consequent overloading of the compactor. The concave, curvilinear rearward surface 38e of the compactor has the effect of moving tire shreds rearwardly and simultaneously upwardly as the compactor moves rearwardly so as to ensure that the entire storage chamber 35 is filled with tire shreds.

Shredder 36 also desirably further includes a spray nozzle 152 positioned to discharge water downwardly into the area between the counter rotating blades 48 as the blades are rotating to shred tires 145. The water from nozzle 152 has the effect of cooling and lubricating the tire shreds 145a. It will be understood that a water tank and water pump (not shown) will also be provided to provide a supply of pressurized water to the nozzle 152.

The truck further includes a further photoelectric eye 154 positioned on the conveyor assembly and operative to count each tire as the tire is loaded onto the truck. For example, and as best seen in FIG. 6, a photoelectric eye 154 may be provided on split belt conveyor 52 where it senses the passage of each tire 145 between the elements of the photoelectric eye. The passage of each tire is arranged to be digitally read out on a suitable instrument in the cab 18 of the truck and a record of each tire loaded onto the truck is entered into a suitable memory device positioned in the cab of the truck. The truck further desirably includes a mobile fax which enables the operator to fax a bill of lading at the end of each pickup to the recycling facility 160 where the information on the fax is recorded for each pickup made by the truck so that, when the truck eventually arrives at the recycling facility with a full load of shredded tires, the facility is already aware of the number of tires on the truck and the pounds of rubber on the truck generated by the shredded tires. To ensure against theft on the part of the driver, the truck desirably is weighed in as it arrives at the recycling facility to ensure that all of the tires that have been loaded onto the truck are accounted for. The truck also desirably includes a mobile telephone to facilitate communication between the driver and the recycling facility so that the operator may follow either a preselected route of retail sales outlets or may receive directions for a new retail sales outlet after each pick up.

Preferably the shredder also includes an overload sensing device which, in the event of jamming of the shredder due to an overload condition or due to the inadvertent loading of foreign objects into the shredder, shuts down the shredder, and also shuts down the conveyor assembly to preclude the delivery of more tires to the shredder until such time as the shredder has been cleared.

The floor 34f of the body structure preferably has a slight slope downwardly toward the front of the body structure so that water from the spray nozzle 152, as well as stagnant water collected in the tires, collects on the floor toward the front end of the body structure where it may be conveniently discharged, for example into a sewage drain, through a discharge drain opening 156. Upon arrival of the truck at recycling facility 160, the tire shreds 145a are discharged from the truck and suitably delivered to facility 160 where the tire shreds are reduced to a rubber crumb material 162. This rubber crumb material 162 is in turn fed to a further processing apparatus 164 where the rubber crumb is mixed with recycled plastic material to form a resin compound of rubber and plastic in the form of pellets 166. The rubber/plastic resin compound pellets 166 provide a feed stock that has many applications in the production of commercial products. For example, the pellets 166 may be used in the formation of asphalt pavement mixtures, in the formation of asphalt emulsion/sealants, or in the formation of asphalt roofing products.

The invention is further illustrated in FIG. 11 in association with an industrial park or complex 168. Complex 168 includes recycling facility 160 and further processing facilities 170, 172 and 174 situated proximate recycling facility 160 within complex 168 and positioned to receive rubber crumb material 176 produced by recycling facility 160 and selectively convert the crumb material into a plurality of diverse finished products. For example, facility 170 may produce pallets; facility 172 may produce road surface additives, and facility 174 may produce truck bed liners. In each case, recycled plastic material would advantageously be mixed with the rubber crumb material in the respective manufacturing process to produce the pallets, road surface additives, and truck bed liners.

As previously indicated, recycling facility 160 is arranged to receive tire shreds and convert the tire shreds into rubber crumb material. The tire shred requirements of the recycling facility 160 are satisfied by dispatching one or more motor vehicles 10 on a scheduled basis from the recycling facility on a route 177 extending from the recycling facility successively to each of several retail tire sales locations 178. At each retail tire location, accumulated used tires are fed to the on-board shredding facility, the tires are shredded, and the shredded tires are compacted into the storage facility of the motor vehicle. At such time as the route is completed or the motor vehicle storage facility is filled to capacity with tire shreds, the motor vehicle returns to the recycling facility 160 and unloads its shredded tire content at the recycling facility. The recycling facility 160 may take various forms. A specific form is shown, as an example, in FIG. 12.

Figure 12:
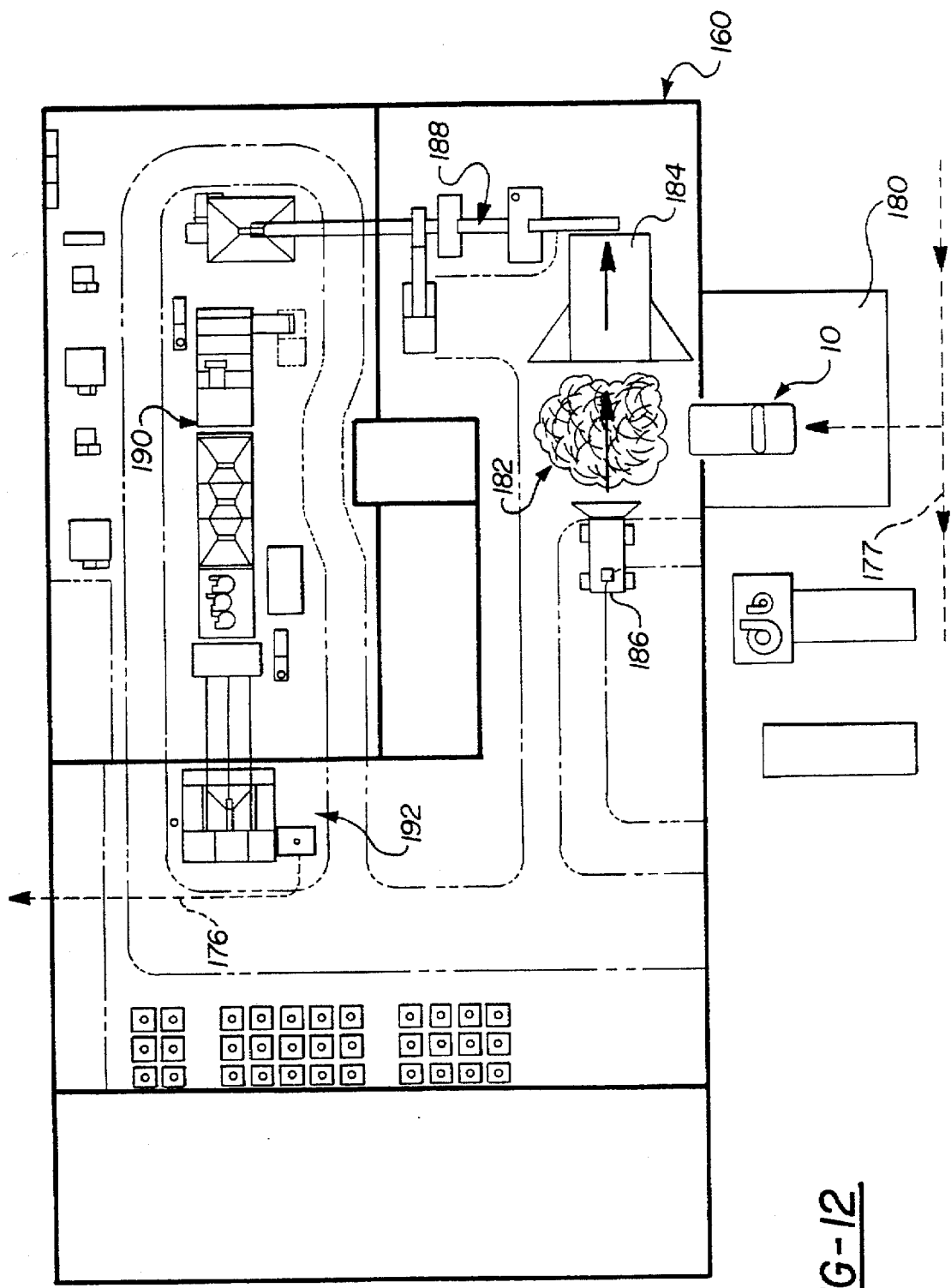
FIG. 12 is a plan view of a recycling facility utilized in the invention methodology.

In the recycling facility 160 of FIG. 12, motor vehicle 10 is backed onto a loading dock 180 whereafter the shredded tire content of the motor vehicle is dumped, using the compactor, onto a fixed unloading surface 182, whereafter the shredded tires unloaded from the motor vehicle are moved onto a walking floor 184 utilizing a plow-equipped forklift truck 186, whereafter the tire shreds are moved along a granulating line 188 where the shreds are reduced to a granular material, whereafter the tire granules are moved along a powderizing line 190 to produce a rubber crumb or powder which is suitably bagged at a bagging facility 192, whereafter the bagged powdered rubber is suitably conveyed to the diverse processing facilities 170, 172, and 174 for use in producing pallets, road surface additives, and truck bed liners, respectively. The bagged powderized rubber may also be delivered along a route 194 to further processing facilities located remote from the recycling facility 160.

As previously indicated, the small independent truck operators who have traditionally picked up used tires have often failed to deliver the tires to an authorized dump site but rather have dumped the tires at the most convenient or closest location where they become an eyesore and further exacerbate the environmental problems associated with tire disposal. The invention apparatus and methodology facilitate the use of a unique manifest system for tracking tires that have been collected and ensuring that each tire is properly processed and disposed of.

The manifest system employs a control or manifest document 194 (FIG. 13) which includes (for example) four copies. The document 194 is intended to provide a record for each tire as to where the tire originated (the retailer); who collected the tire and when (the transporter); where the tire was taken (the recycler or processor); and what was done with the tire (the disposition of the tire at the recycler or processor location). This manifest system ties into a master route management system wherein tire retailers who have signed tire collection contracts are entered into the route management system as a tire generator or customer. Each customer decides on a specific frequency of collection (daily, weekly, etc.) and this data is entered into the route management system. Each day every driver of a mobile tire shredding vehicle 10 is given a list of calls to make for the day in order of traffic and route sequence. A master computer system produces a preprinted manifest document for each customer to be collected from on that particular day. The computer system also directs the driver to collect any monies owed by the customer for arrears services rendered. At each retail location the driver completes one section of the manifest indicating how many tires were collected at that location and the nature of the tires collected (i.e., passenger car, truck or oversized). The document section is completed and signed by both the driver and the manager of the retail location before tire loading and shredding is performed by the driver. With respect to the four copies of the document, one copy is utilized to generate a facsimile transmission to an administrative controller (located for example at recycling facility 160) utilizing the mobile, on board facsimile and this copy is retained by the driver and turned in to the administrator at day's end; a second copy accompanies any remittance given by the customer to the driver (every driver will have a small deposit-only safe located in the cab of the vehicle); a third copy is given to the recycler or processor, with appropriate signatures, after a further section of the document has been completed to indicate receipt of the scrap tires; and the fourth copy is given to the retailer after mutual signatures. The manifest system made possible by the invention methodology ensures tight control with respect to the pickup and disposal of each used tire and, specifically, ensures that each used tire will be processed to form a commercially valuable rubber crumb material for use in producing various finished products.

Although the invention motor truck has been described in association with processing rubber motor vehicle tires, the invention motor truck has usefulness wherever it is desired to process any type of solid waste material. For example, the invention motor truck may be utilized to process plastic waste in the form of plastic bottles. In this application, the conveyor assembly 50 would be modified to specifically handle pickup and delivery of plastic bottles to the shredder 36. The handling of plastic bottles might be accomplished by the provision of a separate conveyor system on the roadside of the truck, opposite the conveyor system for picking up tires, which would operate to deliver plastic bottles to the shredder. Whereas the same motor truck might have a curbside conveyor system for handling rubber tires and a roadside conveyor system for handling plastic bottles, more typically the motor truck would have one conveyor system or the other.

The invention motor truck will be seen to have many important advantages. Specifically, the motor truck provides a viable alternative to the present system of disposing of rubber tires where the tires are typically collected from the retail sales sites and hauled to dump sites where they create an eyesore, a fire hazard, and an environmentally offensive condition. The present invention allows the scrap tires to be efficiently collected and taken to a recycling center where they are reduced to rubber crumb which may be further processed at further processing facilities to form diverse finished products. The invention motor truck, and the invention methodology, thereby serve to simultaneously eliminate an environmental problem and simultaneously produce a commercially usable product.

Yet more specifically, the invention motor truck, by allowing the shredding of the scrap tires at each retail site, allows a given vehicle to collect a far greater amount of scrap rubber than is possible utilizing conventional trucks, thereby adding considerably to the efficiency of the collection process. The invention motor truck and methodology further provide a convenient and efficient means of collecting and processing any type of solid waste material.

Whereas a preferred embodiment of the invention has been illustrated and described in detail, it will be apparent that various changes may be made in the disclosed embodiment without departing from the scope or spirit of the invention.

I claim:

1. A mobile tire shredding apparatus comprising:

a motor truck including a chassis;

a body structure immovably mounted on the chassis and defining a storage chamber extending from the front wall of the body structure to an open rear end of the body structure;

a shredder mounted on the body structure in overlying relation to the storage chamber and including a bottom discharge discharging downwardly into the storage chamber and a shredder box having an open top;

a door closing the open rear end of the body structure and defining the rear end of the storage chamber;

a compactor positioned in the storage chamber;

power means operative to move the compactor within the storage chamber from a forward position to a rearward position proximate the rear end of the body structure; and endless conveyor means mounted on the truck and including a conveyor run defining a conveyor path extending from a loading location proximate the support surface of the truck to a discharge location proximate the open top of the shredder box so that successive tires may be loaded onto the conveyor run at the loading location to move the tires successively up the conveyor path for successive discharge into the open top of the shredder box, successive shredding by the shredder, and successive discharge downwardly into the storage chamber.

2. A mobile tire shredding apparatus according to claim 1 wherein:

the conveyor run includes a first portion extending generally vertically upwardly along one side of the body structure and a second portion extending generally horizontally to a location proximate the open top of the shredder box.

3. A mobile tire shredding apparatus according to claim 2 wherein the conveyor means is moveable between a stored position in which the first vertical run portion is positioned proximate the side face of the body structure and an operative position in which the first vertical run portion is inclined with respect to the body structure.

4. A mobile shredding apparatus according to claim 2 wherein:

the conveyor run further includes a third portion positioned to receive the discharge of the second portion and angling downwardly therefrom to a discharge location directly overlying the open top of the shredder box.

5. A mobile tire shredding apparatus according to claim 1 wherein:

the compactor is operative with the door in an open position to discharge the contents of the storage chamber out of the rear end of the body structure.

6. A mobile tire shredding apparatus according to claim 1 wherein:

the compactor has an angled rear face with its forward most point proximate the upper end of the compactor and its rearward most point proximate the lower end of the compactor so as to impart an upward movement component to shredded material engaged by the compactor as the compactor moves rearwardly in the storage chamber.

7. A mobile tire shredding apparatus according to claim 1 wherein:

the compactor is positioned within the storage chamber beneath the output of the shredder and forwardly of the rear end of the storage chamber, has a cross-sectional configuration approximating the cross-sectional configuration of the storage chamber, is operative when stroked with the door in the closed position to move rearwardly within the storage chamber to compact the discharge of the shredder into the storage chamber, and is operative when stroked with the door in an open position to move rearwardly to a position proximate the door to eject the contents of the storage chamber out of the open rear end of the body structure.

8. A mobile tire shredding apparatus according to claim 1 wherein:

the conveyor means is moveable between an operative position in which the upper end of the conveyor means profile is positioned above the open top of the shredder box and a stored position in which the upper end of the conveyor means profile is lowered with respect to the operative position profile so as to reduce the clearance height of the truck.

9. A mobile tire shredding apparatus according to claim 1 wherein:

the shredder is mounted on the body structure in overlying relation to the forward end of the storage chamber, the compactor is positioned in the storage chamber beneath the shredder so as to receive the output of the shredder, and the forward position of the compactor is beneath the shredder.

10. A mobile tire shredding apparatus according to claim 1 wherein the apparatus further includes a spray device positioned to discharge a lubricant into the shredder box to cool and lubricate the tire shreds.

* * * * *